UNITED STATES PATENT OFFICE.

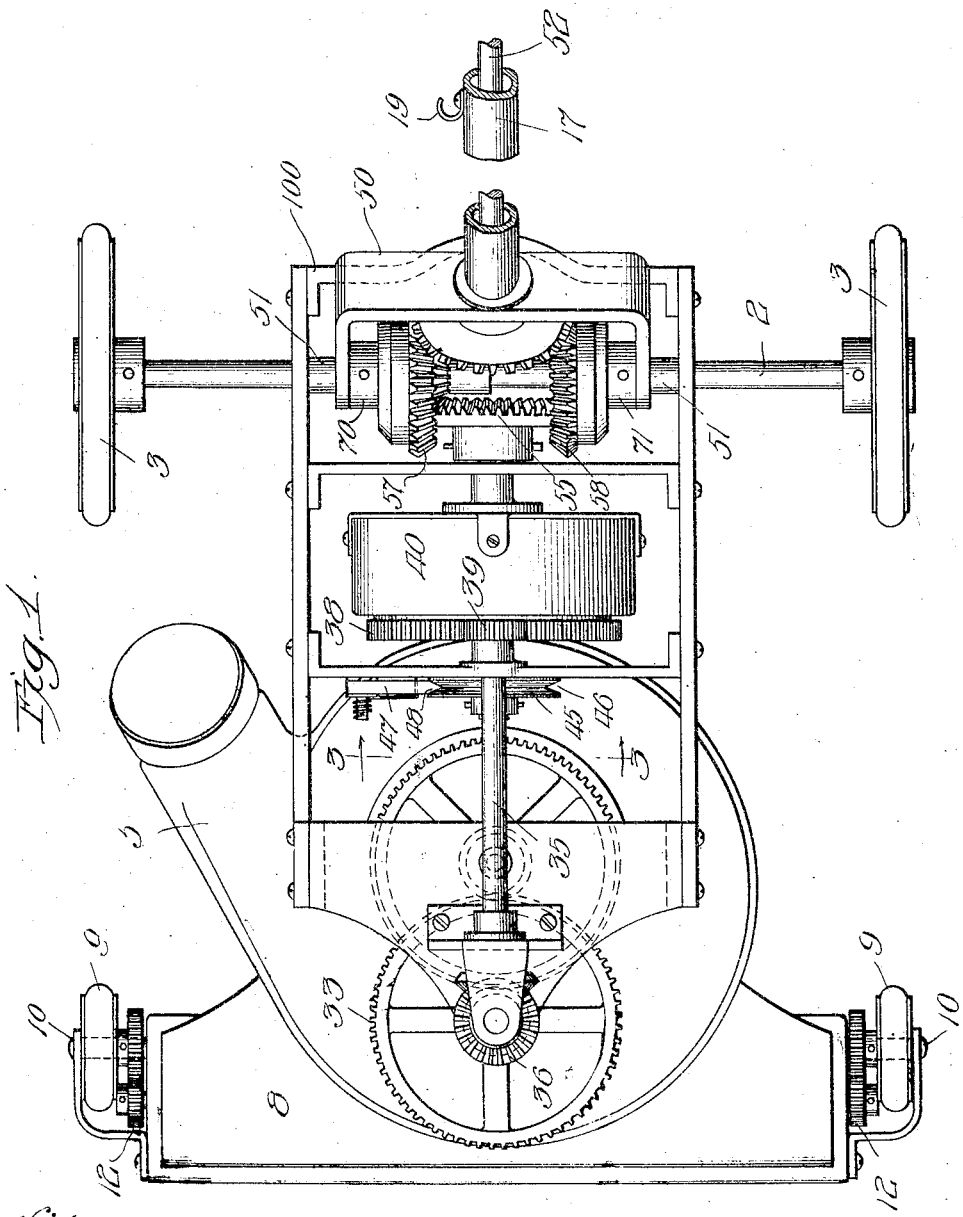

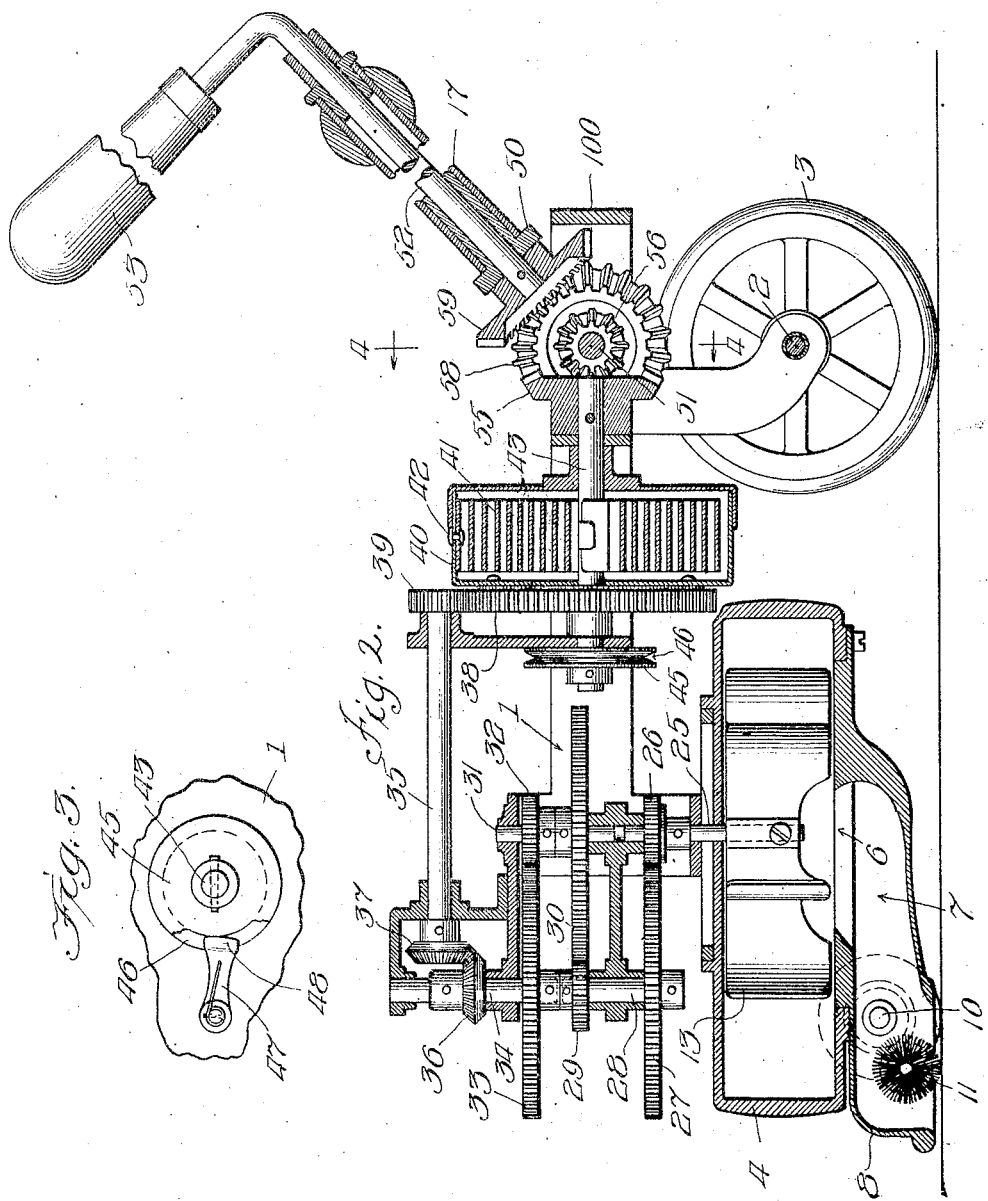

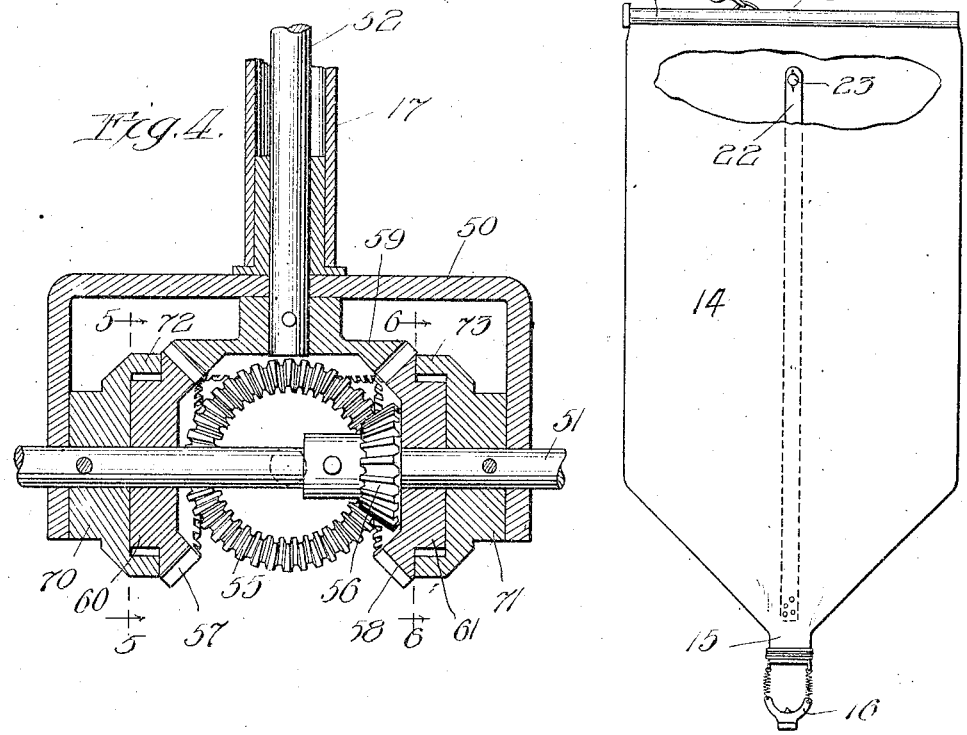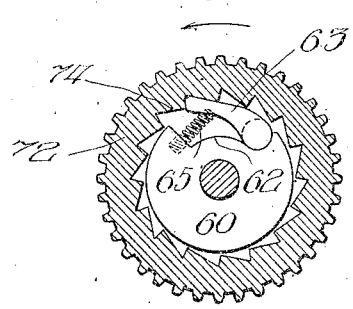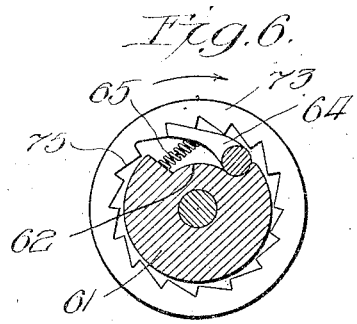

EZRA B. SMITH, OF CHICAGO, ILLINOIS, ASSIGNOR TO JERSEY SWEEPER COMPANY, OF CHICAGO, ILLINOIS, A CORPORATION OF ILLINOIS.

VACUUM-CLEANER.

1,235,849.  Specification of Letters Patent.  Patented Aug. 7, 1917.

Application filed January 6, 1913. Serial No. 740,279.

*To all whom it may concern:*

Be it known that I, EZRA B. SMITH, a citizen of the United States, residing at Chicago, county of Cook, State of Illinois, have invented a certain new and useful Improvement in Vacuum-Cleaners, and declare the following to be a full, clear, and exact description of the same, such as will enable others skilled in the art to which it pertains to make and use the same, reference being had to the accompanying drawings, which form a part of this specification.

My invention has for its object to produce a simple, powerful and reliable vacuum cleaner in which the suction-producing device is operated by a simple and convenient manually-actuated mechanism.

A further object of my invention is to produce a simple and novel vacuum cleaner in which power may be stored so as to make it possible to continue the suction for a considerable time after the application of power ceases and also to permit a continuous operation of the suction device with an intermittent application of power.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a top plan view of an apparatus arranged in accordance with one form of my invention, the housing or casing being omitted;

Fig. 2 is a vertical section taken through the longitudinal axis of the cleaner;

Fig. 3 is a detail of a device associated with the main shaft to permit the latter to rotate in one direction and prevent rotation in the opposite direction, being a view taken on line 3—3 of Fig. 1;

Fig. 4 is a section approximately on line 4—4 of Fig. 2 with the handle raised into an approximately vertical position;

Fig. 5 is a section taken on line 5—5 of Fig. 4;

Fig. 6 is a section taken on line 6—6 of Fig. 4; and

Fig. 7 is a side view of the dirt receptacle or bag.

Referring to the drawings, 1 represents a suitable frame structure supported at the rear upon an axle, 2, having thereon wheels, 3. At the front of the frame is mounted a fan casing, 4, preferably lying horizontally so as to permit the use of a relatively large fan without making the height of the cleaner too great. At one side of the fan casing is a discharge outlet, 5, arranged tangentially as is usual in fans of the centrifugal type. In the center of the under side of the casing is an inlet opening, 6, leading to an inlet conduit, 7, which extends forwardly beneath the fan casing and terminates in a long, comparatively wide box, 8, closed at the top and sides and open at the bottom. The box may rest directly on the floor and serve as a support for the front end of the machine, but I prefer to make use of wheels or rollers of some kind which will hold the bottom of the box slightly above the floor, thus leaving a slight air space around the open mouth of the box and doing away with the friction which would result through contact between the mouth of the box and a floor rug or carpet. In the arrangement shown the support for the front end of the machine consists of small wheels, 9, mounted on a suitable transverse axle, 10, fixed in or secured to the walls of the member 8. Within the member 8 is preferably journaled a small rotary brush 11 driven from the wheels 9 or the axle 10 through suitable power transmitting devices such as friction wheels or gearing 12. With this arrangement, when the machine is pushed over the floor, the brush revolves, loosens the dirt and assists in picking up threads and fibers of various kinds which sometimes adhere very tightly to carpets or rugs.

Within the fan casing is a centrifugal fan 13, which, when in operation, draws in air through the mouth of the box 8 from which it passes up through the conduit 7 and inlet opening 6 and is finally discharged by the fan through the outlet 5. From the discharge outlet of the fan the air and dirt may be carried away in any suitable manner, preferably into some sort of a container as, for example, a bag, 14, having a reduced neck, 15, which fits over the discharge outlet and is detachably held in place by a suitable catch 16; the other end of the bag being provided with suitable means for supporting it upon the handle 17 by which the machine is moved and operated as will be hereinafter described. In the arrangement shown, the top of the bag has fastened to it a few links 18, the outer of which is adapted to be passed over a hook 19 on the handle. The upper end or mouth of the bag may be suitably closed in any suitable way as, for example, by means of a clamping device 20 which may be removed so as to open the mouth of the bag and permit its contents to be discharged. It is often desirable to turn the bag inside out in order to make it easy to remove threads or other material which may cling to the walls and, in fact, it is desirable to empty the bag by turning it inside out in order to make it unnecessary to shake the bag and thus scatter the dirt about. This turning of the bag is generally accomplished by thrusting an arm into the bag, taking hold of the bottom and drawing it out through the mouth; this operation soiling the hands and arms of the user and therefore being objectionable.

In accordance with one feature of my invention I have provided means for conveniently turning the bag inside out. To this end I arrange in the bag a strap, 22, which is fastened at its lower end to the bag in the vicinity of the reduced neck, the other end being preferably detachably fastened, as indicated at 23, to a point near the mouth of the bag. When it is desired to empty the bag, the clamp or closing device, 20, is removed, the outer end of the strap is released and, by drawing the strap out through the mouth of the bag, the bottom of the bag is lifted and follows the inner end of the strap outwardly until the bag has been turned inside out. With this arrangement, the bag may be emptied quickly and without danger of soiling the person or clothing of the user.

One of the most important features of my invention has to do with the driving of the fan and consists generally in a train of mechanism between the fan and an operating handle with a comparatively powerful spring interposed so that the motion of the handle is transmitted to the fan but is greatly multiplied before reaching the fan so that the latter may revolve at a very high speed and thus produce a powerful suction. The power from the operating handle is transmitted through the spring which serves both to store power and to equalize it, the storing of the power making it possible for the fan to run for a considerable time after the movement of the operating handle has ceased and the equalizing effect of the spring serving to transform an intermittent motion of the operating handle into a continuous motion of the fan.

Referring now to the drawings, it will be seen that the fan is hung on the lower end of a shaft 25 which is journaled in and suspended from a part of the main frame. On the shaft 25 is a pinion, 26, which meshes with a gear wheel, 27, carried on a second shaft 28 also journaled in and suspended from the frame. On the shaft 28 is a pinion 29, meshing with a gear wheel, 30, fixed to a shaft 31 journaled in the frame above and coaxial with the fan shaft 25. On the shaft 31 is a pinion 32, meshing with a gear wheel, 33, fixed to a shaft 34 journaled in the frame above and coaxial with the shaft 28. It will be seen that this train of gearing serves to transmit motion from the shaft 34 to the fan shaft 25, but at a greatly multiplied rate so that the fan shaft must revolve a great many times during each single revolution of the driving shaft 34. In the arrangement shown, the shaft 34 is driven from a horizontal counter-shaft 35 through coöperating bevel gears, 36 and 37, carried respectively by the shaft 34 and the shaft 35. The counter-shaft is in turn driven from a gear wheel 38 meshing with a pinion, 39, on the counter-shaft; the gear wheel 38 being fixed to and movable with a rotary spring casing 40. It will be seen that the gear 38 and pinion 39 constitute a speed-multiplying mechanism which cause the counter-shaft to rotate at a much higher speed than that of the spring casing. Within the spring casing is a powerful spring 41, preferably of spiral form having its outer end connected to the spring casing as indicated at 42 and having its inner end secured to a shaft 43 passing through the spring casing and serving to support the spring casing and its attached gear wheel 38, the casing and its gear wheel being revoluble upon the shaft. It will be seen that by turning the shaft 43 the tendency is to wind up the spring from the center. As soon as the tension of the spring becomes great enough to overcome the resistance of the driving mechanism between the spring casing and the fan and the inertia of this mechanism, the gear trains are set in operation and the fan begins to rotate. As the winding movement of the shaft 43 continues, a propelling force will continue to be transmitted through the spring to the fan and the tension of the spring will remain constant, or will be increased or decreased according to the speed at which the winding shaft is turning; the fan acting as a governor for controlling the unwinding of the spring in addition to performing its function of a suction creating device. Therefore if the winding shaft is turned so as to wind the spring faster than it is permitted to unwind by the fan, power will be stored within the spring while if the winding shaft tends to wind the spring more slowly than it is being permitted to unwind by the fan, the spring will give up some of its power and its tension will be decreased. This arrangement makes it possible to set the fan in motion and bring it up to any desired speed by operating the winding shaft in any one of a number of different ways, either intermittently or continuously, so long as the total winding effort on the spring is greater than the power which is consumed in unwinding and driving the fan.

Associated with the shaft 43 is a suitable holding device which will prevent it from moving backward, that is which will prevent the unwinding of the spring at the center. In the arrangement shown, this holding device consists of a wheel, 45, fixed upon the end of the shaft 43 and having a V-shaped groove, 46, extending circumferentially around the same. On a part of the frame of the machine, adjacent to the wheel 45, is pivoted a dog, 47, having a cam-shaped end, 48, extending into the V-shaped groove in the wheel. The parts are so proportioned that when the winding shaft and its wheel, 45, are turned in one direction, the clockwise direction as viewed in Fig. 3, the dog is automatically lifted and swung out of the way so as not to interfere with the rotation of the shaft. As soon as the shaft starts to rotate in the opposite direction, the dog is drawn down so as to become wedged in the groove and arrests the backward movement of the winding shaft. It will be seen that the wheel 45 and the dog 47 are in effect a pawl and ratchet device in which there is an infinite number of teeth so that the backward motion of the shaft is arrested in its inception and consequently there is no lost motion in the winding shaft and all the power which is impressed on the spring must be applied through the driving gearing for the fan and can not be released through any backward movement of the winding shaft. Furthermore, by having smooth engaging surfaces between the wheel and the dog, the action during the winding is noiseless, the noise incident to the riding of a pawl over ratchet teeth in the ordinary pawl and ratchet device being entirely eliminated.

In machines of this kind it is necessary to have a handle by which they are moved over the floor, this being the handle 17 to which I have heretofore referred and in order to permit the fan to be operated conveniently while the machine is being moved about, I prefer to have a suitable, simple operating means for the winding shaft associated with the propelling handle for the machine. In the arrangement shown, the handle 17 has at its inner end a fork or yoke, 50, journaled upon a transverse shaft, 51, carried by the frame of the machine. This permits the handle to be swung in a vertical plane. Consequently the handle may be held at any desired angle which will be most convenient for the user. Furthermore, I make use of this capacity for swinging movements on the part of the handle to secure a rotation of the winding shaft so that the winding shaft may be turned by simply moving the handle up and down. This method of applying power to the fan mechanism may not always answer as is the case where the machine is pushed under a piece of furniture and the handle must lie in its lowermost position and has no capacity for swinging movements. For this reason I prefer to associate with the handle some other power-applying device which does not depend for its operation on any particular angular position of the handle itself. To this end I have made the handle tubular and have extended through it a shaft, 52, having on its outer end a suitable handle lever or other device, 53, by which it may be rotated within the main handle. The driving connections between the winding shaft and its operating means are as follows: The shaft 51 on which the propelling handle of the machine is journaled lies just behind the winding shaft and has its axis in a horizontal plane containing the axis of the winding shaft. On the end of the winding shaft adjacent to the shaft 51 is a bevel gear, 55, meshing with a bevel pinion, 56, fixed to the shaft 51. Consequently a rotation of the shaft 51 in the proper direction will cause the winding shaft to be turned. Loose on the shaft 51 are two bevel gears, 57 and 58, these gears lying on opposite sides of and meshing with a bevel gear 59 fixed upon the inner end of the operating shaft 52 which is journaled in the main handle 17. Each of the bevel gears 57 and 58 is provided with a hub, indicated at 60 and 61 respectively, and these hubs have sections 62 cut away for the reception of pivoted pawls or dogs, 63 and 64 respectively. The free ends of the dogs or pawls are pressed outwardly by suitable springs, 65. Fixed to the shaft 51 are two members, 70 and 71, having annular hoodlike portions, 72 and 73, which surround the hubs 60 and 61 respectively. The members 72 and 73 are provided with internal ratchet teeth, 74 and 75, respectively; these ratchet teeth being adapted to coöperate with the dogs or pawls 63 and 64. The pawl and ratchet devices are so arranged that they both are capable of turning the shaft 51 in the same direction and of course have no influence on the shaft when they are turned backward. From this arrangement it follows that when the main handle of the machine is swung up and down the bevel gear 59 turns the gears 57 and 58 back and forth, the gears 57 and 58 moving together and in the same direction. During the upward movement of the handle the pawls 63 and 64 are caused to turn the members 72 and 73, and therefore the shaft 51, while on the downward movement of the handle, these pawls slip back over the ratchet teeth and no movement of the members 72 and 73 or of the shaft 51 results. When the shaft 52 is turned, the rotation of the bevel gear 59 carried thereby is transmitted to the gears 57 and 58, but these two gears are caused to turn in opposite directions. Consequently when the shaft 52 is turned in one direction the pawl and ratchet devices between the bevel gear 57 and the member 70 come into play and produce a rotation of the shaft 51 while the pawl on the other side slips idly over the ratchet teeth and has no effect on the turning movement of the shaft 51. When the shaft 52 is turned in the opposite direction, however, the pawl 63 carried by the bevel gear 57 is the idle pawl and the pawl 64 carried by the bevel gear 58 is the active one which produces a turning movement of the shaft 51. It will therefore be seen that during an upward movement of the handle 17 and during a rotation in either direction of the shaft 52 a turning movement of the shaft 51 in a constant direction is produced and this turning movement of the shaft 51 is transmitted to the winding shaft through the pinion 56 and the bevel gear 55 fixed to the winding shaft. It will also be seen that the parts are so arranged that the thrust on the bevel gears 57 and 58 which tends to actuate the winding shaft is always in the upward and forward direction behind the shaft 51 so that the tendency is to press down on the front end of the machine. In other words, there is never any tendency to lift the front end of the machine off the floor as would be the case if the power thrusts upon the gear wheels 57 and 58 were downward and backward instead of upward and forward. I regard this as an important feature because if the application of power were such that when the spring is under a considerable tension there would be a tendency to lift the front end of the machine off the floor, the purpose of the entire machine would be defeated. It will be seen that I eliminate the tendency to lift the front end of the machine without producing a tendency to lift the back end of the machine because the downward thrust of the yoke 50 on the shaft 51 substantially balances the upward thrust on the bevel gears.

The operation is as follows: Normally the handle comes to rest with the yoke lying upon the crosspiece 100 at the back of the frame, the parts being substantially in the positions indicated in Fig. 2 or, if desired, the handle can be swung toward the left from the position indicated in Fig. 2 until it stands substantially upright or is inclined forwardly from a vertical plane passing through the axis of the shaft 51, the handle being self-supporting in this latter position and lying directly above the body of the machine so as to take up very little room. To clean a carpet, rug or floor, the winding shaft is turned, preferably by turning the operating member 53 of the shaft 52 or swinging this member back and forth. As soon as the spring is placed under a small tension the fan begins to operate and as the tension of the spring increases the speed of the fan increases until a powerful suction through the mouth of the inlet box 8 is obtained, this suction drawing dust, dirt, threads and small particles on the floor into the fan casing from which they are discharged into the bag 14 through the centrifugal action of the fan. As the machine is pushed across the floor the small brush in the mouth of the machine is caused to rotate and serves to loosen any dirt which may stick to the floor and assists in picking up thread, hair and other stringy or fibrous things. The operating device for the winding shaft need not be moved continuously since it is sufficient to work it from time to time as the fan shows indications of slowing down. When it is desired to clean the floor under a piece of furniture the handle is depressed sufficiently to permit the machine to be run underneath the furniture and the fan is kept in motion as before. As I have heretofore explained, the fan may be kept running for a considerable time after the movement of the operating handle or device ceases and this has the advantage, in addition to those already enumerated, of permitting the machine to be inserted in out of the way places where it may be inconvenient to manipulate it and the operating members, the spring being first wound up and the fan being driven by the stored power in the spring. During the operation of the fan the air and dirt is discharged into the bag where the dirt is filtered from the air and the air passes through the mesh in the bag as pure, clean air. From time to time the bag is emptied in the manner heretofore explained.

In pushing the machine over the floor the front end may conveniently be lifted but slightly by pressing down upon the handle until the latter engages with the top of the cross bar 100 at the rear end of the frame, thus permitting the machine to run easily from the floor on to a rug or over an obstruction of any kind.

It will thus be seen that I have produced a simple and novel machine which has all the advantages of an electrically driven machine without the disadvantage of a cord or cable of limited length which must be attached to a socket and detached therefrom whenever it is desired to run the cleaner to a point beyond the limits allowed by the length of the cable. It will also be seen that my machine possesses all the advantages of previous mechanically actuated machines, while in addition it contains means for equalizing and storing power and is so constructed and arranged as to permit the easy and convenient application of power when the machine is run under furniture or in difficult or out of the way places.

While I have illustrated and described with particularity only a single embodiment of my invention, I do not desire to be limited to the exact structural details thus illustrated and described; but intend to cover all forms and arrangements which fall within the terms employed in the definitions of my invention constituting the appended claims.

I claim:

1. In a machine of the character described, a suction fan at the front end of the machine, a train of gearing connected to the fan for driving the same, a spring connected to said train of gearing, a winding shaft for said spring having a bevel gear wheel at the rear end of the machine, a second bevel gear coöperating with the aforesaid bevel gear, and means for applying power to said second gear in a direction to produce a downward thrust upon the front end of the machine, said fan having a dust-receiving inlet.

2. In a machine of the character described, a suction fan supported at the front end of the machine, power transmitting mechanism including a storing and equalizing device carried by the machine and extending toward the rear end thereof, and means at the rear end of the machine for applying power to said mechanism in a direction producing a downward thrust upon the front end of the machine, said fan having a dust-receiving inlet.

3. In a machine of the character described, a carriage, a fan casing at the front end of the carriage and having a downwardly-opening inlet, a suction fan in said casing, a spring mounted on the carriage, gearing between the spring and the fan, a propelling handle for said carriage connected to the rear end thereof, and a driving connection between said handle and said spring.

4. In a machine of the character described, a carriage, a fan casing mounted at the front end of the carriage and having a downwardly-opening inlet, a suction fan arranged in said casing, a propelling handle for said carriage at the rear end thereof, a horizontal shaft revolubly mounted in the carriage in front of said handle, driving connections between said handle and said shaft, a spring connected to said shaft, and gearing arranged between said spring and said fan.

5. In a machine of the character described, a carriage, a suction fan mounted on the front end of the carriage so as to revolve about a vertical axis, a casing surrounding said fan and having an outwardly-opening inlet, a horizontal shaft revolubly mounted in the carriage in rear of the fan casing, a spring connected at one end to and supported by said shaft, gearing between the other end of said spring and said fan, a propelling handle for said carriage arranged at the rear end thereof, and means associated with said handle for rotating said shaft.

6. In a machine of the character described, a carriage, a shallow suction fan mounted at the front end of the carriage so as to be revoluble about a vertical axis, a fan casing surrounding said fan and having a downwardly-opening inlet, a power equalizing and storing spring mounted on said carriage in rear of the fan, gearing between said spring and said fan, a propelling handle for the carriage connected to the rear end thereof, and means associated with said handle for winding said spring.

7. In a machine of the character described, a carriage, a suction fan device mounted on the front of the carriage and having a downwardly-opening inlet, a power-equalizing and storing spring mounted on said carriage, gearing between said spring and said fan device, a propelling handle for the carriage arranged at the rear end thereof, and gearing between said propelling handle and said spring, the latter gearing being arranged to produce a downward thrust on the front end of the carriage when the gearing is being operated.

8. In a machine of the character described, a suction fan at the front end of the machine, a train of gearing connected to the fan for driving the same, a spring connected to said gearing, a winding shaft for said spring having a bevel gear at the rear end of the machine, a propelling handle for the machine connected to the rear end thereof and having thereon a bevel gear, a third bevel gear arranged between the aforesaid bevel gears, and clutch mechanism coöperating with one of said bevel gears to limit the driving connection to a direction producing a downward thrust on the front end of the machine.

In testimony whereof, I sign this specification in the presence of two witnesses.

EZRA B. SMITH.

Witnesses:
HARRY S. GAITHER,
RUTH E. ZETTERVALL.